United States Patent Office 3,070,945
Patented Jan. 1, 1963

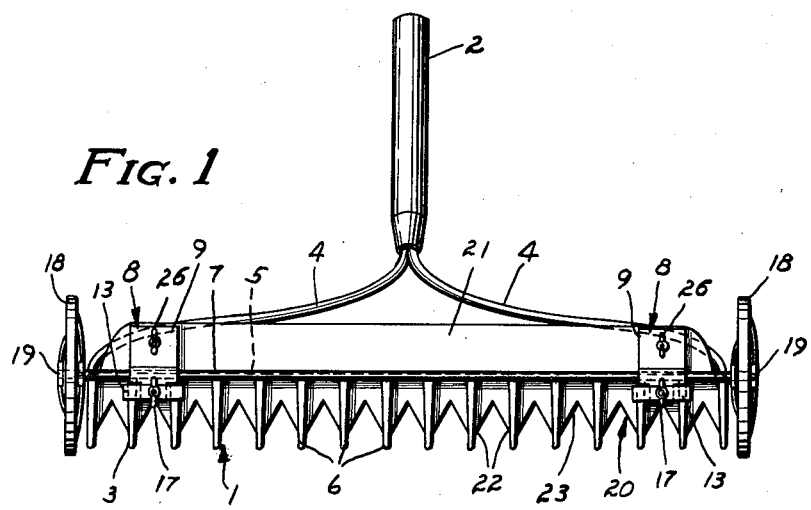
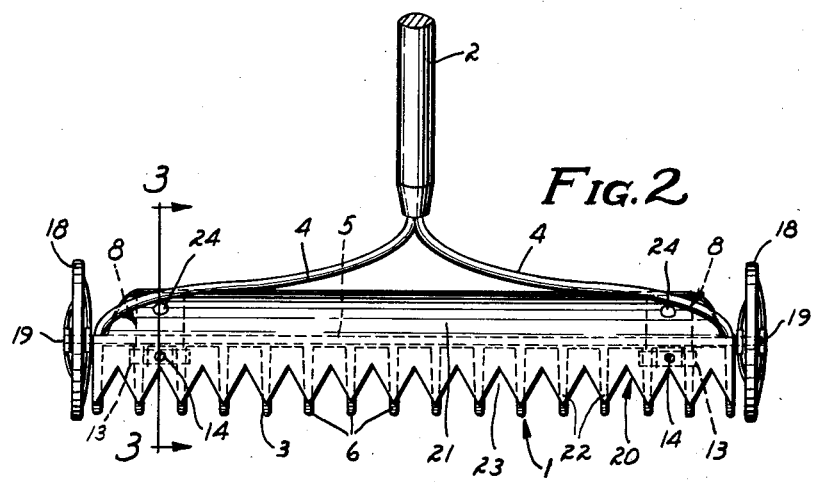
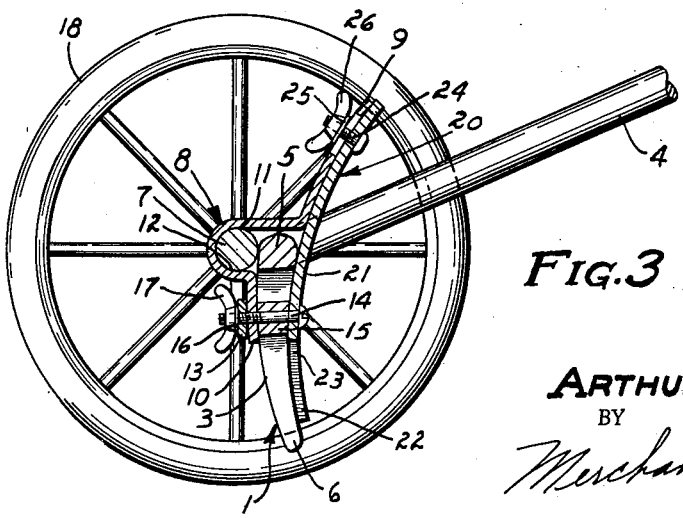

3,070,945
ATTACHMENT FOR RAKES
Arthur S. Uglem, 3500 Xerxes Ave. N.,
Minneapolis, Minn.
Filed Feb. 6, 1961, Ser. No. 87,206
3 Claims. (Cl. 56—400.01)

This invention relates generally to rakes, and more particularly it relates to an attachment for rakes of the type used as garden tools for raking lawns and for similar purposes.

An important object of this invention is the provision of a rake which is equipped with means for limiting the lowering movements of the tines of the rake into the turf of the lawn whereby to prevent damage to the grass.

Another object of this invention is the provision of a rake which is characterized by an improved sweeping action, and which is equipped with an apron-like shield associated with the tines of the rake for restricting the openings between the tines so as to increase the gathering effectiveness of the rake.

Another object of this invention is the provision of a rake which enables the user thereof to rake the lawn quickly and thoroughly with greater ease and convenience than he would be able to do with an ordinary lawn rake.

A still further object of this invention is the provision of an attachment for rakes which may be easily and quickly attached to and removed from well known and ordinary types of rake structures without requiring modification of the structure of the rake.

A further object of this invention is the provision of a rake which efficiently sustains the above objects and purposes, but is not cumbersome in design or operation.

Other objects of this invention reside in the provision of an attachment for rakes which is extremely simple in construction, economical to manufacture, and durable so as to permit long periods of continued use.

The foregoing and other objects and advantages of this invention will become apparent from the following detailed specification, appended claims and attached drawings.

Referring to the drawings wherein like reference characters indicate like parts or elements throughout the several views:

FIG. 1 is a view in front elevation of my invention;
FIG. 2 is a view in rear elevation thereof; and
FIG. 3 is a view in vertical section taken on the line 3—3 of FIG. 2.

Referring with greater particularity to the drawings, the reference numeral 1 represents the rake in its entirety, which comprises an elongated handle 2 and a rake head 3 secured to the lower end of the handle 2. The rake head 3 comprises a pair of yoke arms 4, an elongated head bar 5 rigidly secured to and extending between the yoke arms 4, and a plurality of spaced and depending tines 6 defined by the head bar 5.

In accordance with my invention, an elongated shaft 7 is rigidly but removably secured to the rake head 3 and disposed with its axis in general normality to the handle 2 and the tines 6. The shaft 7 is secured to the rake head 3 by means of a pair of brackets, each represented generally by the reference numeral 8. Each of the brackets 8 comprises an upper flange 9, a lower flange 10, the upper and lower flanges 9, 10 each defining cooperating bearing portions 11, 12 respectively. The brackets 8 are each secured in relatively widely spaced relationship to the rake head 3 by means of an associated clamp bar 13 which cooperates with the lower flange 10 of the bracket 8 whereby to clamp each of the brackets 8 to an adjacent pair of the tines 6, as seen particularly in FIGS. 1 and 3. It is noted that each of the clamp bars 13 are secured to the respective lower flanges 10 of each of the brackets 8 by means of a bolt 14, a cylindrical spacer 15, a washer 16, and a wing nut 17.

When the brackets 8 are secured to the rake head 3 in the above-described manner, the elongated shaft 7 is then removably received within the bearing portions 11, 12 of the brackets 8 so as to journal the shaft 7 for free rotation. A pair of wheels 18 are one each secured on an opposite end 19 of the shaft 7 one each in closely spaced relationship to an adjacent end of the rake head 3. It is noted that the wheels 18 are preferably, and as shown, of a size sufficient to prevent the tines 6 of the rake head 3 from digging into the ground when the rake is being used so as to prevent damage to the turf.

According to present practices, an apron-like shield, represented generally by the reference numeral 20 is rigidly but removably secured to the rake head 3 in generally adjacent relationship to the tines 6 of the rake head 3. It is noted that the shield 20 is formed from a material such as sheet metal or plastic. The shield 20 is preferably, and as shown, arcuately formed and disposed with its concave surface 21 facing in a generally rearward direction. The shield 20 defines at its lower edge 22 a plurality of spaced generally triangularly-shaped teeth 23, the teeth 23 forming generally triangularly shaped notches between them, as seen particularly in FIGS. 1 and 2. It will be noted that each of the teeth 23 is disposed adjacent to and rearwardly of each of the tines 6 of the rake head 3 whereby to provide means for restricting the openings between the tines 6 so as to increase the gathering effectiveness of the rake 1. An seen particularly in FIGS. 1 and 3, the shield 20 is secured to the rake head 3 by means of the upper flanges 9 of the above-described brackets 8, the same being fastened by means of a flat head bolt 24, a washer 25, and a wing nut 26.

Having specifically described my invention, the operative simplicity thereof should be explicit in the above description; however, it might be well to state that the addition of the above described attachment to the rake 1 greatly increases the sweeping action of the rake since the teeth 23 of the shield 20 serve to restrict the openings between the tines 6 of the rake 1 and the wheels 18 serves to prevent lowering movements of the tines 6 into the grass.

This invention has been thoroughly tested and found to be completely satisfactory for the accomplishment of the above objects; and while I have shown and described above the preferred embodiment thereof in which the principles of the present invention have been incorporated, I wish it to be specifically understood that the same may be modified without departure from the scope and spirit of the appended claims.

What I claim is:

1. A rake comprising an elongated handle, a rake head secured to the forward end of said handle, said rake head defining a plurality of depending tines disposed in spaced relationship transversely with respect to said handle, a pair of wheels carried by said rake head and one each rotatably disposed in closely spaced relationship to an adjacent end of said rake head, said wheels being of a diameter sufficient to prevent said tines from digging into the ground, and an apron-like shield rigidly but removably secured to said rake head in generally adjacent relationship to the tines of said rake head, said shield defining a plurality of spaced generally triangularly-shaped teeth one each disposed adjacent to each of said tines for restricting the openings between said tines so as to increase the gathering effectiveness of said rake.

2. A rake comprising an elongated handle, a rake head secured to the forward end of said handle, said rake head defining a plurality of depending tines disposed in spaced relationship transversely with respect to said handle, an elongated shaft secured to said rake head and disposed with its axis in general normality to said handle, a pair of wheels one each disposed for rotation on an opposite end of said shaft in closely spaced relationship to an adjacent end of said rake head, said wheels being of a diameter sufficient to prevent said tines from digging into the ground, and an apron-like shield rigidly but removably secured to said rake head in generally adjacent relationship to the tines of said rake head, said shield defining a plurality of spaced generally triangularly-shaped teeth one each disposed adjacent to and rearwardly of each of said tines for restricting the openings between said tines so as to increase the gathering effectiveness of said rake.

3. A rake comprising an elongated handle, a rake head secured to the forward end of said handle, said rake head defining a plurality of depending tines disposed in spaced relationship transversely with respect to said handle, an elongated shaft secured to said rake head and disposed with its axis in general normality to said handle, a pair of wheels one each disposed for rotation on an opposite end of said shaft in closely spaced relationship to an adjacent end of said rake head, said wheels being of a diameter sufficient to prevent said tines from digging into the ground, and an apron-like sheet metal shield rigidly but removably secured to said rake head in generally adjacent relationship to the tines of said rake head, said shield being arcuately formed and disposed with its concave surface facing in a generally rearward direction, said shield defining at its lower edge a plurality of spaced generally triangularly-shaped teeth forming generally triangularly-shaped notches between them and one each of said teeth being disposed adjacent to and rearwardly of each of said tines for restricting the openings between said tines so as to increase the gathering effectiveness of said rake.

References Cited in the file of this patent

UNITED STATES PATENTS

| | | |
|---|---|---|
| 2,539,590 | Perzynski | Jan. 30, 1951 |
| 2,697,905 | Moriarty | Dec. 28, 1954 |
| 2,706,375 | McLaughlin | Apr. 19, 1955 |
| 2,780,976 | Koering | Feb. 12, 1957 |